United States Patent [19]
Pollington et al.

[11] Patent Number: 5,672,145
[45] Date of Patent: Sep. 30, 1997

[54] TOOL CAROUSEL

[75] Inventors: Andrew Roy Pollington; Harish Mandalia, both of Leicester, England

[73] Assignee: Bridgeport Machines Inc., Bridgeport, Conn.

[21] Appl. No.: 670,163

[22] Filed: Jun. 27, 1996

[51] Int. Cl.[6] .................... B23Q 3/157; A47F 5/05
[52] U.S. Cl. .................... 483/59; 483/66; 483/67; 483/65; 211/1.52; 211/70.6
[58] Field of Search .................... 483/58, 59, 60, 483/61, 66, 67, 63, 65, 68; 211/1.52, 70.6

[56] References Cited

U.S. PATENT DOCUMENTS

| | | | |
|---|---|---|---|
| 3,296,903 | 1/1967 | Coate | 483/59 |
| 4,338,709 | 7/1982 | Straub et al. | 483/59 |
| 4,344,221 | 8/1982 | Pagani | 483/58 |
| 4,399,604 | 8/1983 | Krug | 483/67 |
| 4,590,662 | 5/1986 | Norota | 483/64 |
| 5,300,006 | 4/1994 | Tanaka et al. | 483/67 |

FOREIGN PATENT DOCUMENTS

| | | | |
|---|---|---|---|
| 3424178 | 4/1985 | Germany | 483/68 |
| 3613206 | 10/1987 | Germany | 483/68 |

*Primary Examiner*—M. Rachuba
*Assistant Examiner*—Christopher Kirkman
*Attorney, Agent, or Firm*—Ware, Fressola, Van Der Sluys & Adolphson LLP

[57] ABSTRACT

A tool carousel is provided comprising a carousel wheel mounted on a shaft of the tool carousel, a series of holders mounted to and distributed around the periphery of the carousel wheel to hold, respectively, a series of individually removable tools. Carousel locator formations are distributed at intervals around the carousel wheel, whereby the carousel wheel can be rotated or indexed to any desired rotational position corresponding to a selected one of the tools. The carousel wheel of the tool carousel comprises several individual elements, each of a molded plastic material, arranged in a ring side-by-side with each other around the shaft, each element extending radially outwardly from the shaft. A radially outer part of each element is connected or joined to a correspondingly radially outer part of each of two adjacent elements, one on either side thereof, the elements having portions of the carousel locator formations formed integrally therewith and having the holders formed integrally therewith.

19 Claims, 5 Drawing Sheets

TOOL CAROUSEL

FIELD OF THE INVENTION

This invention relates to a tool carousel.

A tool carousel comprises a wheel-like structure (a "carousel-wheel") which, in use, carries a series of individually removable tools distributed around its periphery and which is adapted to be rotatably indexed, that is, steppingly rotated, so as to bring any selected one of said individually removable tools to a predetermined rotational position whereat the tool carousel can present the selected tool to a machine tool for the selected tool to be removed by the machine tool from the tool carousel, for use, and thereafter replaced.

PRIOR ART

Tools for use in a machine tool are invariably heavy metal items and the carousel-wheel of a tool carousel therefore has to be strong and sturdy enough to carry all of the tools without buckling or breaking over a long period of time during which the tool carousel is required to operate reliably, without breakdown. It is therefore not surprising that the carousel-wheels of known tool carousels are invariably heavy, all-metal, assemblies. The (all-metal) carousel-wheel of one such known tool carousel comprises two sturdy, and therefore heavy, wheels secured together, one wheel having spring-steel tool-holders secured to the wheel around its periphery, the other wheel having carousel-locator slots formed in its periphery for the carousel to be indexed to, and located at, different rotational positions by a form of "Geneva Wheel" mechanism.

SUMMARY OF THE INVENTION

It is an object of the invention to provide a tool carousel with a carousel-wheel which is easier, and less expensive, to manufacture and, if necessary, repair, than that of the known tool carousel.

According to the invention there is provided a tool carousel comprising: a carousel-wheel mounted on a shaft of the tool carousel; a series of holders mounted to, and distributed around the periphery of, the carousel-wheel, to hold respectively a series of individually removable tools; and a series of carousel-locator formations, distributed around the periphery of the carousel-wheel, whereby the carousel-wheel can be rotated, or indexed, to any desired rotational position corresponding to a selected one of said tools; characterised in that the carousel-wheel of the tool carousel comprises several individual elements, each of moulded plastics material, arranged in a ring, side-by-side with each other, around the shaft; each said element extending radially outwardly from the shaft; a radially outer part of each said element being connected or joined to a corresponding radially outer part of each of two adjacent said elements, one on either side thereof; said elements having said series of carousel-locator formations formed integrally therewith and having said holders formed integrally therewith.

Preferably, each said element is in the form of a part-circular or part-annular segment of moulded plastics material, each segment comprising two sides which diverge from each other in a radially outward direction, and preferably comprising a respective side wall at each said side of each said segment.

Preferably, the elements in the or each ring are mutually secured together by means of integrally formed undercut tongues and grooves or dovetail tongues and grooves of said segments interengaging with each other. Preferably each above-mentioned side wall has formed therein a said undercut or dovetail tongue or groove.

Preferably, each carousel-locator formation is a slot, adapted for engagement by a Geneva Wheel mechanism.

Preferably, the plastics material of each element contains a chemical lubricant which lubricates the Geneva wheel mechanism.

Preferably, each of the above-mentioned two side walls of the segment has a recess to form part of a said carousel-locator slot of the carousel.

Preferably, a radially inner end of each of at least some of the elements comprises an integral element-securing formation, for example, a boss with a through-hole.

Preferably, each element decreases progressively in axial thickness, radially outwardly.

The invention will be described by way of example with reference to the accompanying drawings.

DETAILED DESCRIPTION OF PREFERRED EMBODIMENT

Tool Carousel 10 & Carousel-wheel 12

Referring to the drawings, there is illustrated a tool carousel 10, see FIGS. 1 to 4, which embodies the present invention. The tool carousel 10 comprises a steppingly rotatable carousel-wheel 12, mounted on a fixed, vertical, shaft 14 and carrying a series of individually removable tools 15a, 15b, 15c, 15d, . . . which are distributed around its periphery. The tool carousel 10 is adapted to index, or steppingly rotate, the carousel-wheel 12 so as to bring any selected one of said tools to a rotational position whereat the selected tool can be presented to, and removed by a machine tool, for use, and thereafter replaced.

More particularly, the tool carousel 10 comprises: the carousel-wheel 12; a series of holders 16 mounted to, and distributed around the periphery of, the carousel-wheel 12, to hold respectively the series of individually removable tools 15; and a series of carousel-locator slots 18, distributed around the periphery of the carousel-wheel 12, for the tool carousel 10 to be steppingly rotated to, or indexed to, and located at, any desired rotational position corresponding to a selected one of said tools 15. The tool carousel 10 is characterised in that the carousel-wheel 12 comprises a single ring of mutually identical elements 22, each in the form of a part-circular or part-annular segment of moulded plastics material, secured mutually together, the segments 22 having the series of carousel-locator slots 18 formed integrally therewith and also having the holders 16 formed integrally therewith.

The carousel-locator slots 18 are adapted for indexing engagement by a Geneva wheel mechanism 24, described hereinafter.

Detailed description of segments 22

Each moulded plastics segment 22 will now be described in detail with reference to FIGS. 5 to 9.

Figure 5:
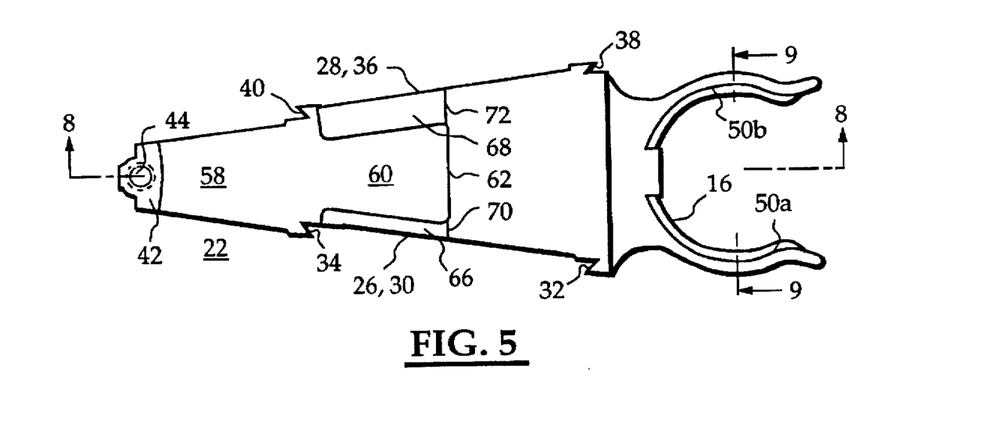
FIG. 5 is a much enlarged plan view of one of a series of moulded plastics segments comprised in the carousel of FIGS. 1 to 4.
Figures 6, 7:
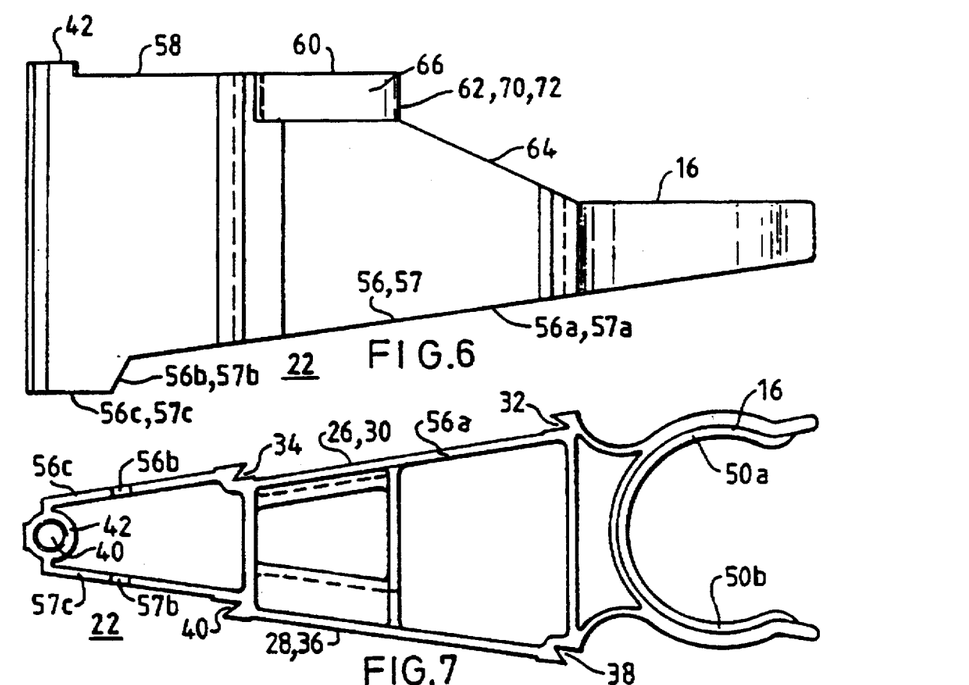
FIG. 6 is a side view of the segment of FIG. 5, to the same scale as FIG. 5.
FIG. 7 is an underneath plan view of the segment of FIG. 5, to the same scale as FIG. 5.

Referring to FIGS. 5 and 7, each segment 22 has two side walls 26, 28 which diverge symmetrically away from each other in a radially outward direction as shown, so that the segment 22 increases progressively in width, radially outwardly. Hence, securing the series of segments 22 together, with the side wall 26 of one adjacent the side wall 28 of the next, forms the ring.

As shown in FIGS. 5 and 7, a part of the side wall 26 has a wide dovetail, or undercut, groove 30, formed between two notches 32 and 34. A corresponding part of the side wall 28 has a corresponding dovetail, or undercut, tongue 36, extending between two notches 38 and 40. These said parts of side walls 26 and 28, having the groove 30 and tongue 36 respectively, are radially outer parts in the sense of being substantially outward, in a radial direction, from the radially inner end of the segment 22. The notches 32 and 38 are, as is preferred, adjacent the radially outer ends of side walls 26 and 28 respectively, whilst the notches 34 and 40 are part-way along the same respective side walls. When the segments 22 are assembled together to form the ring, the tongue 36 of side wall 28 of one segment 22 is fitted tightly into the adjacent groove 30 of the immediately neighbouring segment 22. At the radially inner end of each plastics segment 22 is a boss 42 with a through-hole 44.

It will be appreciated that, if the carousel-wheel 12, comprising the segments 22, is demounted from the remainder of the tool carousel 10, each individual segment 22 can be easily detached from the remainder of the ring of segments 22 for replacement, should it for example be damaged.

At the radially outer end of each plastics segment 22 is a respective one of the holders 16, moulded integrally with the segment 22. Each holder 16 comprises two symmetrical curved, resiliently flexible, arms 50a, 50b defining the major part of a circular space for a correspondingly circular part 52 of a respective one of the tools 15, removably held by the holder 16. Whether the tool 15 is lifted out of the holder 16 and afterwards lowered back again, or whether the tool 15 is snapped in and out of the holder 16 with resilient flexure of arms 50a, 50b depends upon the design of the tool 15 and the construction and manner of operation of the machine tool 10.

Figures 8, 9:
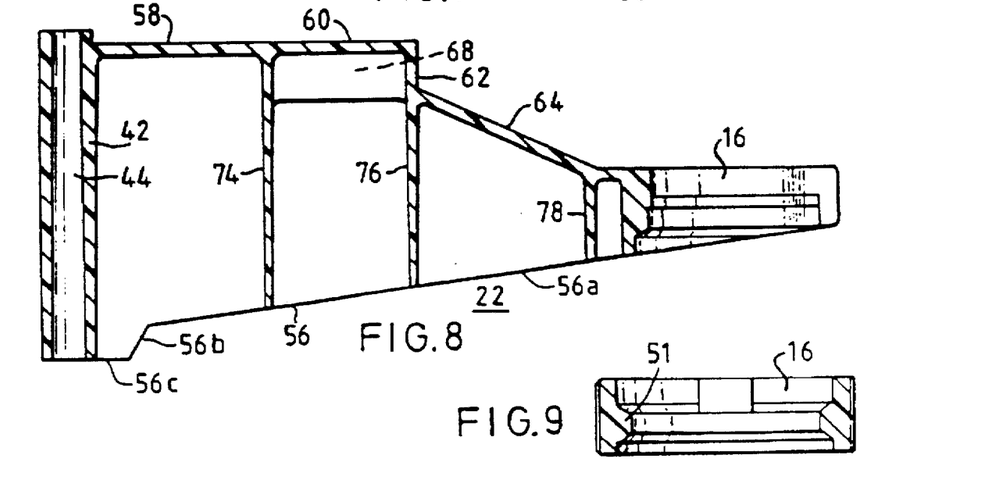
FIG. 8 is section 'C'—'C' of FIG. 5 to the same scale as FIG. 5.
FIG. 9 is section 'D'—'D' of FIG. 5 to the same scale as FIG. 5.

FIG. 9 shows a cross-section of holder 16, and shows clearly the cross-section of a part-annular ledge 51 defined by the holder arms 50a, 50b.

Relatively long portions 56a, 57a of underside edges 56, 57 of side walls 26, 28 respectively slope gently upwards radially away from much more steeply, upwardly sloping, shorter edge portions 56b, 57b, which themselves adjoin short, horizontal, inner edge portions 56c, 57c extending outwardly from the bottom of the boss 42.

The topside of segment 22 comprises a radially innermost flat wall 58, a coplanar, adjoining flat wall 60, a vertical wall 62 and a wall 64 sloping downwardly in a radially outward direction. The radially, innermost flat wall 58 and the coplanar, adjoining wall 60 are both in a plane which is perpendicular to the carousel shaft axis. The vertical wall 62 extends down from the radially outer edge of wall 60 to the radially inner edge of the sloping wall 64, the outer edge of which adjoins the holder 16, the top of which lies in a plane perpendicular to the carousel shaft axis. Hence, the segment 22 decreases progressively in thickness in a radially outward direction.

In each of the diverging side walls 26, 28 of segment 22 is a respective recess 66, 68, co-extensive in a radial direction with annular wall 60. As clearly shown in FIGS. 5 and 7, recess 66 is shallower than recess 68. Both recesses 66, 68 are open at their radially outer ends 70, 72 respectively, either side of vertical wall 62. When the segments 22 are in position in tool carousel 10, recess 66 of one segment 22 and the adjacent recess 68 of the adjacent segment 22 jointly define a respective one of the carousel-locator slots 18. Access to the radially outer ends of carousel-locator slots 18 is provided by the steeply sloping radially outer annular wall 62, sloping away from the outer ends 70, 72 of recesses 66, 68.

As shown in FIGS. 5 and 8, segment 22 has three webs extending from top to bottom and from side wall 26 to side wall 28. That is, the bottoms of webs 74, 76 and 78 are level with the edge portions 56a, 57a, whilst the tops of webs 74, 76 and 78 respectively adjoin the walls 58, 60, 62 and 64 as follows: more particularly, web 74 adjoins the junction between walls 58 and 60; web 76 is coplanar with wall 62 and adjoins the junction between walls 60 and 62; whilst web 78 adjoins the radially outer end of wall 62, which is also the radially outer end of segment 22, adjoining holder 16.

The plastics material of the segments 22 contains a chemical lubricant the function of which is described hereinafter.

Figure 1:
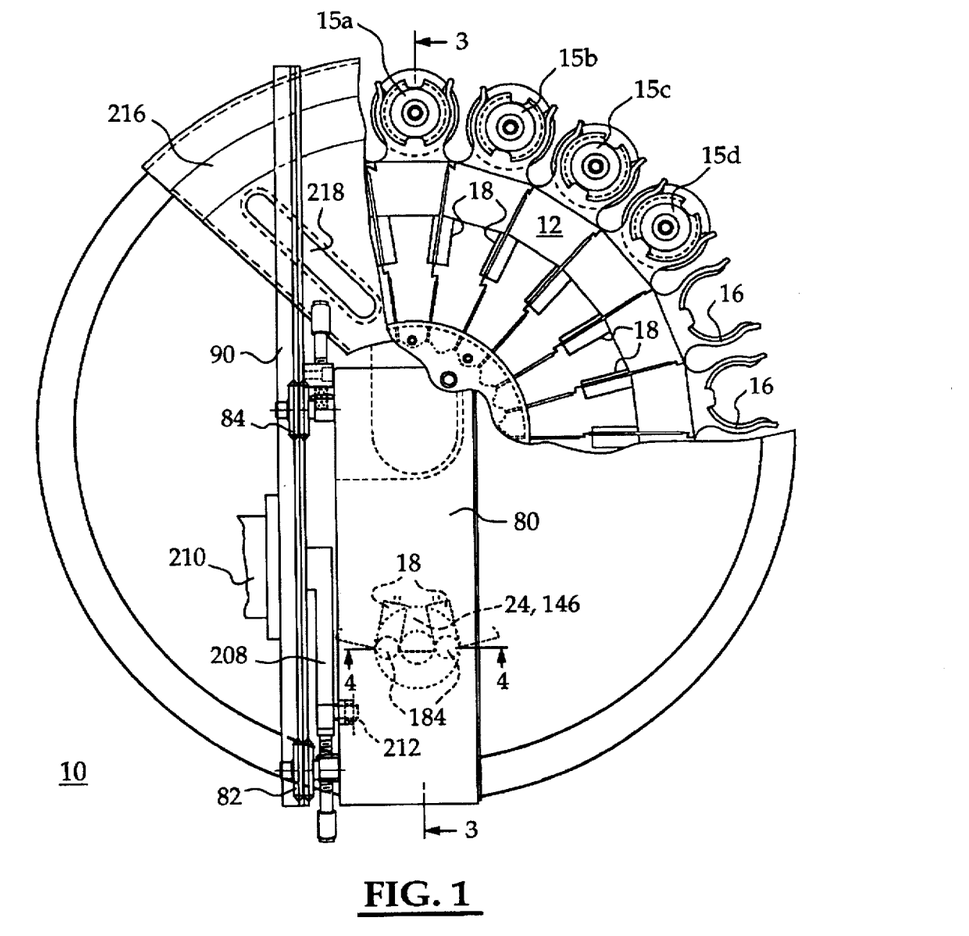
FIG. 1 is a plan view of part of a tool carousel embodying the invention.
Figure 2:
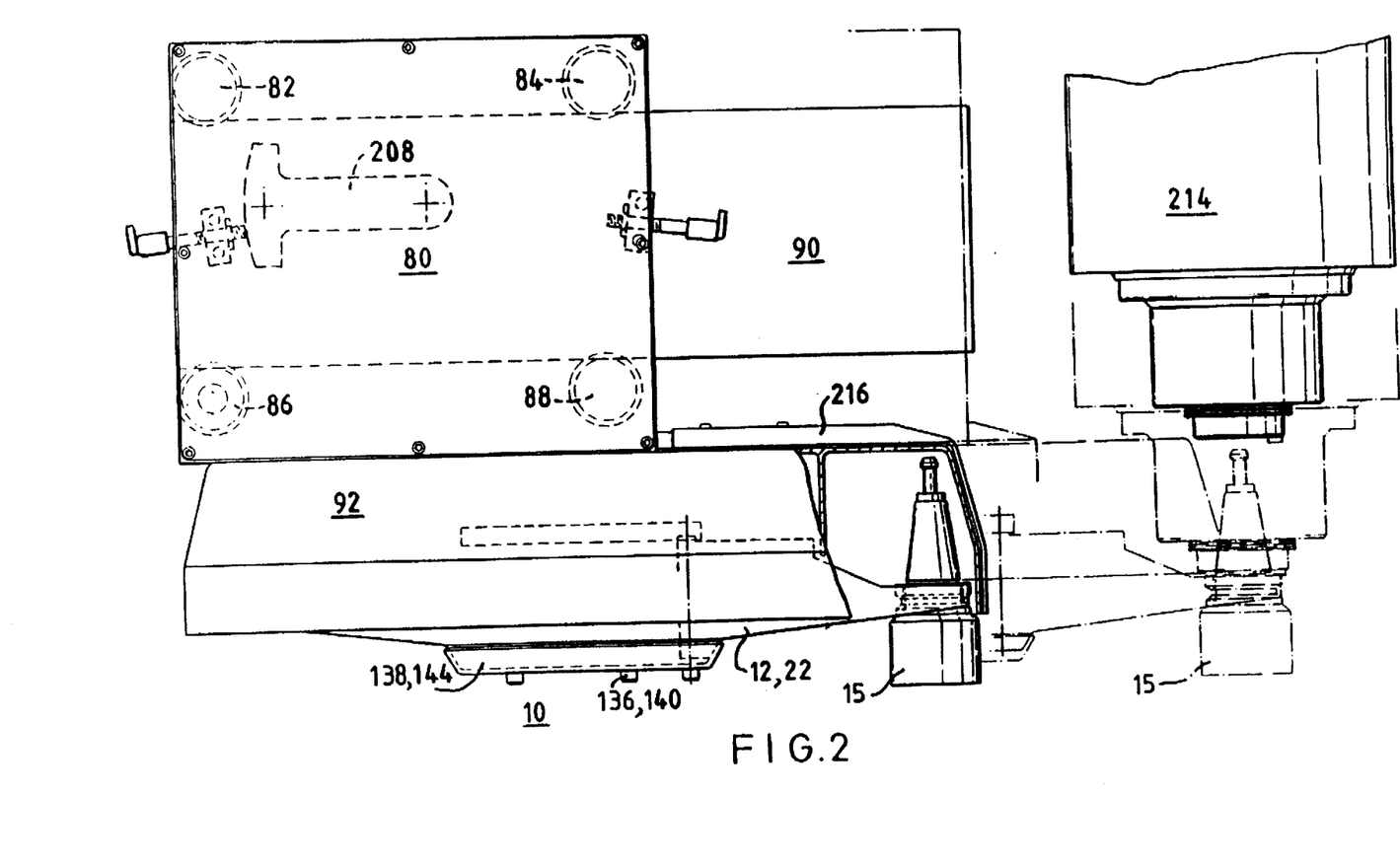
FIG. 2 is a front view of part of FIG. 1, to a slightly different scale, showing the tool carousel and an adjacent part of a machine tool.
Figure 3:
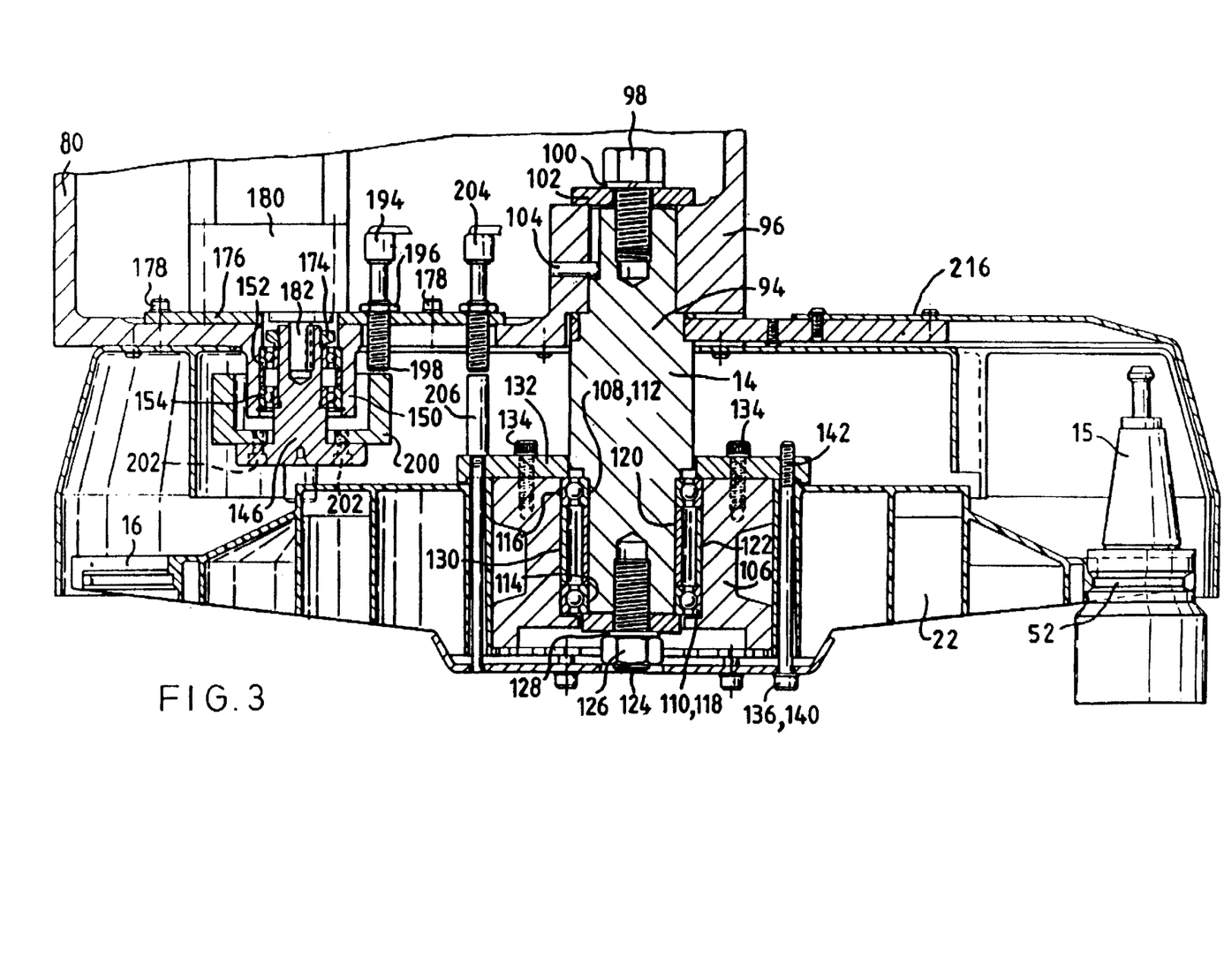
FIG. 3 is part section 'A'—'A' of FIG. 1 to an enlarged scale.

The mounting of Carousel-Wheel 12 (FIGS. 1 to 3)

The tool carousel 10 comprises a carriage 80 having (see FIG. 2) a pair of upper carriage-wheels 82, 84 and a pair of lower carriage-wheels 86, 88. The wheels 82, 84 run along an upper track or rail 90 and the wheels 86, 88 run along a lower track or rail 90. The wheels 82, 84, 86, 88 each have a Vee-section groove (see FIG. 1) in which the respective track or rail 90 is received.

A carousel assembly 92, including the carousel-wheel 12 and the shaft 14 (FIG. 3) is mounted to the underside of carriage 80.

More particularly, a reduced diameter, upper end portion 94 of shaft 14 is received within the bore of a boss 96 forming an integral part of the carriage 80 and is securely fixed in position by a hexhead screw 98, spring washer 100 and clamp washer 102 as shown, being prevented from rotation by a dowel pin 104.

At the bottom end of shaft 14, a hub 106 is rotatably mounted by means of two, upper and lower, ball bearings 108, 110, the respective inner races 112, 114 and outer races 116, 118 of which are mutually spaced-apart by inner and outer spacers 120, 122 as shown. The inner races 112, 114 and spacer 120 are accommodated in a shallow recess at the bottom end of shaft 14 and are secured there by a conventional assembly of a set screw 124, hex locknut-with-washer 126 and lockwasher 128 as shown. The outer races 116, 118 and spacer 122 are accommodated in a recess inside the bore 130 of the hub 106 and are secured there by a hub plate 132 which is secured to the hub 106 by screws 134.

Several (for example, five) bolts 136 very securely clamp a clamp ring 138 to the hub 106. Heads 140 of bolts 136 underlie the clamp ring 138, whilst the screw-threaded top ends 142 of bolts 136 are screwed into the hub plate 132. A turned-up rim 144 of clamp ring 138 clamps the ring of segments 22 by engagement with edge portions 56b (see FIG. 8) thereof.

Figure 4:
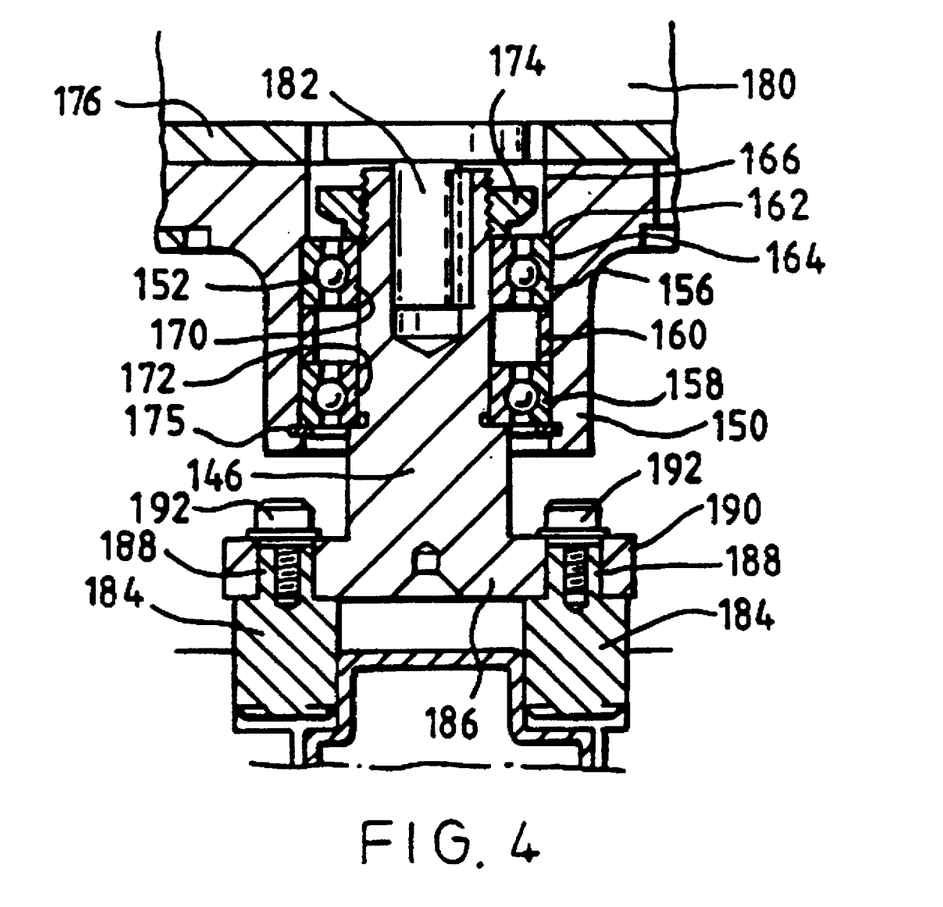
FIG. 4 is part section 'B'—'B' of FIG. 1.

Geneva Wheel Mechanism 24 (FIGS. 1, 3 & 4)

The Geneva wheel mechanism 24 comprises a Geneva drive shaft 146. The Geneva drive shaft 146 is rotatably mounted to a boss 150 of the carriage 80 by means of upper and lower ball bearings 152, 154. The outer races 156, 158 of bearings 152, 154 are spaced apart by a spacer 160. The outer race 156 of the upper bearing 152 abuts a ledge 162 between an enlarged lower portion 164 and a reduced upper portion 166 of the bore of the boss 150. The outer race 158 of the lower bearing 154 is retained within the boss 150 by an internal circlip 168. There being very little downward loading upon bearings 152, 154, and hence there being no real need for an internal spacer between the inner races 170, 172 of bearings 152, 154, no internal spacer is provided, between the inner races 170, 172, although one (not shown) may be provided if desired. Without an internal spacer, the bearing balls effect self-positioning of each inner race 170, 172 relative to the respective outer race 156, 158. A self-locknut 174 is fitted onto the tapped upper end of the Geneva drive shaft 146 and engages the upper inner race 170. The lower bearing 154 rests upon the circlip 168.

A mounting plate 176 is fixed to the carriage 80 by screws 178. A motor 180 is mounted upon the mounting plate 176 above the Geneva drive shaft 146, to drive the Geneva drive shaft 146. The motor shaft 182 projects into a bore at the top of the Geneva drive shaft 146 and, as shown, is keyed with the Geneva drive shaft 146.

Two identical Geneva drive pins 184, 184 are fixed, diametrically opposite each other, to the bottom end 186 of Geneva drive shaft 146. More particularly, an integral, reduced diameter, axial boss 188 at the top of each pin 184 fits tightly into a vertical bore through an integral flange 190 of Geneva drive shaft 146 and is secured by a screw 192, as shown in FIG. 4. The pins 184, 184 enter the Carousel-locator slots 18 of the Carousel-wheel 12. As the Geneva drive shaft 146 rotates half a turn, it steps the Carousel-wheel 12 round by one segment, that is, by the incremental angle between any two successive slots 18.

Because of the chemical lubricant contained in the plastics material of the segments 22, the Geneva wheel mechanisms 24 is lubricated "for life".

Carousel-wheel 12 position-detecting switches

A "slot-to-slot" electrical switch 194 is mounted to the mounting plate 176. More particularly, the cylindrical casing of the switch 194 is externally screw-threaded and is screwed into a tapped hole through the mounting plate 176 and is fixed at an adjustable height by means of a locknut 196. The bottom end 198 of switch 194 detects a switch target 200, which is fixed as shown to the Geneva drive shaft flange 190 by screws 202. Hence the switch 194 produces an electrical signal pulse once per half-revolution of Geneva drive shaft 146.

A "Tool No. 1" reference switch 204, at least substantially identical to switch 194, is positioned to detect a target 206, which is secured to carousel-wheel 12 at a position such that switch 204 produces a position-confirming/correcting signal only when the carousel-wheel 12 is rotated to a position such that "Tool No. 1" is selected for use by the machine tool.

Linear movement of Carriage 80

As mentioned above, carriage 80 is movable—forwards and backwards—along tracks or rails 90 by means of wheels 82, 84, 86 and 88. This movement is caused by an arm 208 which is rotatable by a motor 210 about the axis of the motor 210. A wheel 212 is rotatably mounted to the rotatable arm 208 near the distal end thereof and runs in a guideway (not shown) in carriage 80, to translate the rotary motion of arm 208 into reciprocatory linear motion of carriage 80. The motor 210 may be a reversible stepping motor or an induction motor controlled by electronic circuitry (not shown). The end-points of reversible reciprocation of the carriage 80 along the tracks or rails 90 are controlled by two proximity switches 300, 301. The end of the arm 208 is radiussed to facilitate detection by the proximity switches. FIGS. 1 and 2 show the carriage retracted. FIG. 2 also shows, in chain-dot lines, an extended position in which the carousel-wheel 12 is either providing a tool 15 for, or taking the tool 15 back from, the vertical head of a machine tool, as described in greater detail hereinafter. The spindle 214 is shown retracted upwardly. Again, chain-dot lines show its downward position to exchange a tool with the carousel.

Movable cover member 216

The tool carousel 10 is provided with a movable cover member 216, pivoted at or near the axis of the carousel-wheel 12 and provided with a slot or guideway 218 extending at an angle to the direction of reciprocation of the carriage 80. When the carriage 80 is retracted, the cover member 216 is in place, covering the selected tool 15 and adjacent tools 15. As the carriage 80 is advanced towards the spindle 214 by rotation of arm 208, a fixed pin (not shown) engaging the slot or guideway 218 causes the cover member 216 to pivot aside so as to expose the selected tool 15 to the spindle 214.

In a preferred embodiment, the cover member 216 is mounted on a pivot arm 302, which is rotatably mounted on a section 303 of the shaft 14.

Sequence of movements

The sequence of movements is as follows:

(1) The spindle 214 advances downwardly to the 'ready' position shown in chain-dot lines in FIG. 2, holding a used tool (not shown) that the tool carousel 10 is required to take back.

(2) Simultaneously the tool carousel 10, meanwhile parked in its retracted position as shown in full lines in FIG. 2, rotates the carousel-wheel 12 (only if necessary) to present towards the spindle 214 the empty holder 16 for the tool to be taken back.

(3) Arm 208 rotates, to move the tool carousel 10 towards the position shown in chain-dot lines in FIG. 2, to bring the empty holder 16 into engagement with the tool to be taken back. The arms 50a, 50b flex to snap the holder 16 around the tool to be taken back. Then a "power drawbar" of the machine tool releases the tool, now held only by holder 16.

(4) The spindle 214 retracts upwardly, to clear the carousel-wheel 12.

(5) The carousel-wheel 12 is steppingly rotated, or indexed, to bring the next required tool 15 into the position previously occupied by the used tool 15, in vertical alignment with the spindle 214.

(6) The spindle 214 advances downwardly to take hold of the new tool 15, and its power drawbar is operated to cause it to take hold of the new took 15, still also held by holder 16.

(7) Arm 208 rotates, to move the tool carousel 10 back away from the position shown in chain-dot lines in FIG.

2, to disengage the holder 16 from the tool 15 now held by spindle 214. The arms 50a, 50b flex to snap the holder 16 away from the tool 15.

(8) The machine tool uses the new tool 15. After such use, the sequence restarts at step (1) again.

We claim:

1. A tool carousel comprising: a carousel-wheel mounted on a shaft of the tool carousel; a series of holders mounted to, and distributed around the periphery of, the carousel-wheel, to hold respectively a series of individually removable tools; and a series of carousel-locator formations, distributed at intervals around the carousel-wheel and coacting with powered indexing means, whereby the carousel-wheel can be rotated, or indexed, to any desired rotational position corresponding to a selected one of said tools; characterised in that the carousel-wheel of the tool carousel comprises several individual elements, each of moulded plastics material, arranged in a ring, side-by-side with each other, around the shaft; each said element extending radially outwardly from the shaft; a radially outer part of each said element having means for connecting or joining to a corresponding radially outer part of each of two adjacent said elements, one on either side thereof; each said element having portions of two of said carousel-locator formations formed integrally therewith and having said holders formed integrally therewith.

2. A tool carousel as claimed in claim 1, characterised in that each said element is in the form of a part-circular or part-annular segment of moulded plastics material, each segment comprising two sides which diverge from each other in a radially outward direction.

3. A tool carousel as claimed in claim 2, and comprising a respective side wall at each said side of each said segment.

4. A tool carousel as claimed in claim 3, characterised in that the elements in the or each ring are mutually secured together by means of integrally formed undercut tongues and grooves or dovetail tongues and grooves of said segments interengaging with each other.

5. A tool carousel as claimed in claim 4, characterised in that each said side wall has formed therein a said undercut or dovetail tongue or groove.

6. A tool carousel as claimed in claim 3, characterised in that each carousel-locator formation is a slot, adapted for engagement by a Geneva Wheel mechanism.

7. A tool carousel as claimed in claim 6, wherein the plastics material of each said element contains a chemical lubricant which lubricates the Geneva wheel mechanism.

8. A tool carousel as claimed in claim 6, characterised in that each of said two side walls of the segment has a recess to form part of a said carousel-locator slot of the carousel.

9. A tool carousel as claimed in claim 1, characterised in that a radially inner end of each of at least some of the elements comprises an integral element-securing formation.

10. A tool carousel as claimed in claim 9, characterised in that said element-securing formation comprises a boss with a through-hole.

11. A tool carousel as claimed in claim 1, characterised in that each element decreases progressively in axial thickness, radially outwardly.

12. A tool carousel as claimed in claim 1, characterised in that each element is clamped by a common clamping member.

13. A tool carousel as claimed in claim 12, characterised in that said common clamping member engages at least one radially inward part of each said element.

14. A tool carousel as claimed in claim 3, characterised in that the elements in the ring are mutually secured together by means of integrally formed undercut tongues and grooves or dovetail tongues and grooves of said segments interengaging with each other.

15. A tool carousel as claimed in claim 5, characterised in that each carousel-locator formation is a slot, adapted for engagement by a Geneva Wheel mechanism.

16. A tool carousel as claimed in claim 7, read as appended to at least claim 3, characterised in that each of said two side walls of the segment has a recess to form part of a said carousel-locator slot of the carousel.

17. A tool carousel as claimed in claim 8, characterised in that a radially inner end of each of at least some of the elements comprises an integral element-securing formation.

18. A tool carousel as claimed in claim 10, characterised in that each element decreases progressively in axial thickness, radially outwardly.

19. A tool carousel as claimed in claim 11, characterised in that each element is clamped by a common clamping member.

* * * * *

UNITED STATES PATENT AND TRADEMARK OFFICE
CERTIFICATE OF CORRECTION

PATENT NO. : 5,672,145
DATED : September 30, 1997
INVENTOR(S) : Andrew Roy Pollington and Harish Mandalia It is certified that error appears in the above-identified patent and that said Letters Patent is hereby corrected as shown below:

- Column 7, line 35, claim 4, "or each" should be deleted;

- Column 8, line 30-31, claim 16, "read as appended to at least claim 3," should be deleted.

Signed and Sealed this

Twenty-eighth Day of April, 1998

*Attest:*

BRUCE LEHMAN

*Attesting Officer*   *Commissioner of Patents and Trademarks*